Nov. 22, 1960 R. W. STIRLING 2,961,315

METHOD OF MAKING A CONTACT SCREEN, AND A METHOD OF MAKING A SCREENED POSITIVE FOR THE PREPARATION OF PRINTING PLATES OR THE LIKE

Filed Aug. 25, 1955 2 Sheets-Sheet 1

INVENTOR.
Robert W. Stirling,
BY
Harry B. Cook,
ATTORNEY

INVENTOR.
Robert W. Stirling,
BY Harry B. Cook,
ATTORNEY

United States Patent Office 2,961,315

Patented Nov. 22, 1960

2,961,315

METHOD OF MAKING A CONTACT SCREEN, AND A METHOD OF MAKING A SCREENED POSITIVE FOR THE PREPARATION OF PRINTING PLATES OR THE LIKE

Robert W. Stirling, Plainfield, N.J., assignor to Thos. & Geo. M. Stone, Inc., Newark, N.J., a corporation of New Jersey Filed Aug. 25, 1955, Ser. No. 530,444

4 Claims. (Cl. 96—45)

The invention relates to intaglio or gravure printing. More particularly, the invention relates to an improved method of making a contact screen, and an improved method of producing a screened positive film or plate for use in the preparation of etched plates or cylinders.

Printing plates or cylinders prepared with a conventional photogravure lined screen have etched cells of equal area in a horizontal plane, but which vary in depth. The cells are of greatest depth in a solid printing area and diminish in depth to cells which are very shallow in a highlight or light printing area. The most shallow etched cells carry a comparatively small quantity of ink, which when printed and viewed is barely seen, thereby causing this portion of the picture to be called a highlight or light tone area. If the cells in a light tone area are unduly shallow, the printer may endeavor to compensate for this deficiency by thinning the ink in order to obtain better or more full printing in this area. Thinning of ink, however, is an undesirable practice, because loss of detail results in the solid or shadow portions of the picture or pattern. Moreover, the printing inks used in printing with gravure plates or cylinders are generally ready-mixed, and the engravers endeavor to etch printing plates or cylinders to fit the ink. However, obtaining an adequate depth of etch in a light tone area for a given viscosity of ink is most difficult for uniform printing results. Probably the greatest disadvantage arising out of printing with a form prepared with a conventional gravure lined screen, with the attendant shallow etched cells in a highlighted area, is the poor wearing quality of the very short height of the webs which surround the shallow cells. The continued scraping action of the doctor blade in the press causes wear, so that in an unduly short time these short webs are worn down, resulting in the picture or pattern in a highlighted area appearing empty, while a darker or solid area of the plate or cylinder still provides printing which is firm and solid. Thus, the life of the printing form is materially reduced, because of the limitation of the shallow etched cell portions of the form.

Plates or cylinders prepared with a regular reverse halftone screened positive furnish a checker-board pattern of spaced cells in which the cells are of substantially the same depth in a solid or shadow area as in a highlight or light tone printing area. However, whereas the conventional gravure lined screen method of preparing a printing form presents problems of clear printing definition in the highlighted or very light printing areas, the reverse half-tone screened positive process of preparing a printing form presents problems of suitable definition in the solid or shadow areas. In the solid areas, the ink from one cell has to flush over sufficiently to cover an adjacent unetched portion of the form to provide adequate solid coverage. In order to obtain this flushing action, the engraver will frequently overetch in a lateral or horizontal plane, and as a result isolated pins or pillars are formed in the solid printing areas. While such overetching provides a good solid print, in running the cylinder in the press the doctor blade has a tendency to break off these isolated pins long before the usefulness of the cylinder is otherwise completed. This causes bleed-out or stripping of color and makes the cylinder useless in an unduly short period of time.

In view of the foregoing explanation of the advantages and disadvantages of printing forms prepared with a conventional lined screen and a regular reverse half-tone screened positive, it will be apparent that a printing form prepared in a manner to provide the best features of the conventional gravure lined screen method, with the ability to print definitively and for an extended period of time in the solid or shadow areas, and the regular reverse half-tone screened positive method, with the ability to print properly and for an extended period of time in the very light tone areas, would represent a substantial step forward in the art.

One of the primary objects of the invention is to produce a screened positive film or plate which combines the best features of the conventional photogravure lined screen and of the regular reverse half-tone screened positive. A printing form prepared in accordance with my invention has cells of a pattern similar to a form made with a conventional photogravure lined screen, the cells are all etched to substantially the same depth, as with a form prepared with a regular reverse half-tone screened positive, and the cell walls or webs are of a thickness not less than the thickness of cell walls obtained with a conventional lined gravure screen.

Another object of the invention is to make a contact screen of a character permitting the direct formation of a screened positive film or plate, which does not necessitate the use of a camera or any camera arrangement.

Another object of the invention is to provide a screened positive which permits elimination of the operation of screening the carbon tissue. The printed carbon resist or tissue after being transferred or applied to the cylinder need only be placed in one strength of etching acid to open the cells, and when etching has started is then placed in another acid of greater concentration to etch to desired depth. Etching can be obtained to a uniform and predetermined depth for all areas of the printing form.

Other objects, advantages and results of the invention will be brought out by the following description taken in conjunction with the accompanying drawings, in which.

Figure 1:
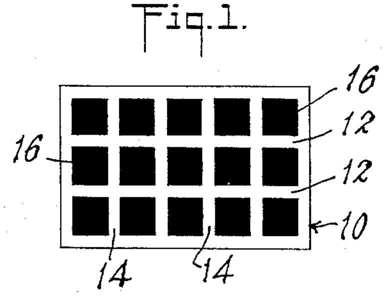
Fig. 1 is an enlarged, partial plan view of a conventional lined, grid-like photogravure screen.
Figure 2:
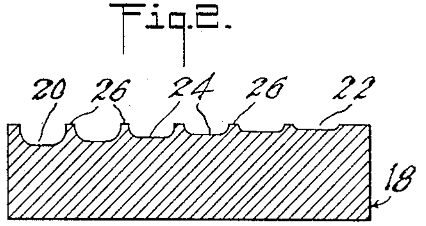
Fig. 2 is an enlarged, partial sectional view of a plate or cylinder prepared with a screen of Fig. 1.

It is believed that the invention may be best described in the light of the prior art methods of preparing a printing plate or cylinder. As shown in Fig. 1 a conventional gravure screen 10 comprises horizontally spaced lines 12 and vertically spaced lines 14 which cross each other at an angle of 90° to provide a grid with intermediate squares or cells 16. The lines may be spaced 75, 85, 100, 120, 150, or any suitable number of lines to the inch that can be applied to photogravure reproduction. The lines are at a ratio to the square formed of 1 to 1, 1 to 1½, 1 to 3, or any ratio applicable to the production of plates of cylinders by photogravure methods. As shown in Fig. 2, a printing form 18, whether a plate or a cylinder, formed with a conventional grid-lined photogravure screen 10, has cells on its printing surface which correspond in size to the size of the squares 16 of the gravure screen in a horizontal plane. However, the cells vary in depth with the greatest depth of cell in a solid or shadow area, as at 20, to cells that are very shallow, as at 22, in a highlighted or very light tone area. The cells in areas of tone intermediate the most solid and the lightest tone areas are of intermediate depth as at 24. Each cell is outlined by a web or wall 26 corresponding to the lines 12 and 14, and as will be apparent the webs in a very light tone area have very little height. The webs surrounding shallow cells 22 have such little height that they are soon worn down by the scraping action of the doctor blade in the press, thereby causing the picture or pattern to look very empty in this area. The greater height and strength of the webs surrounding the more deeply etched cells 20, 24 still afford boundaries for their cells after the boundaries for the shallow etched cells are worn down. Moreover, even if there is some semblance of a web surrounding the shallow etched cells 22, the detail afforded in such area is not as good as the detail furnished by the still well-defined deeper etched cells. A printing form prepared with a conventional grid-like lined photogravure screen thus does not furnish clear printing for a suitable length of time, because of the short height webs or walls in the very light tone areas.

Figure 3:
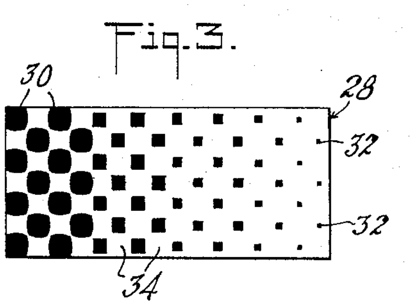
Fig. 3 is an enlarged, partial plan view of a regular reverse half-tone screened positive.
Figure 4:
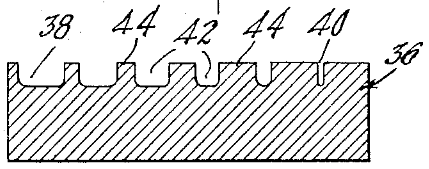
Fig. 4 is an enlarged, partial sectional view of a plate or cylinder formed by means of a regular reverse half-tone screened positive of Fig. 3.

As shown in Fig. 3, a regular reverse half-tone screened positive 28 possesses dots which are offset with respect to each other to provide a checker-board pattern. The dots vary in size in a plane parallel to the surface of the positive from the largest dots 30 in a solid or shadow area to the smallest dots 32 in a highlighted or very light tone printing area. The dots are spaced from each other to a greater or lesser extent, but in all directions, by intermediate light portions 34. A printing form 36, when prepared from a screened positive as shown in Fig. 3, has its cells etched to a uniform depth as shown in Fig. 4. The cells vary in size in a plane parallel to the horizontal surface of the printing form corresponding to the dot size, from the largest cells 38, in a solid or shadow area, to the smallest cells 40 in a highlight area, and, of course, intermediate these extremes there are cells of intermediate size in the areas between the solid and the very light tones. Each cell is surrounded by unetched areas which provide walls 44 corresponding to the light areas 34 on the regular reverse half-tone screened positive 28. Since the size of the dots varies with the tone of the screened positive, the more solid tones have dots which are larger than the dots in the lighter tone areas, and there are greater distances between dots in the highlighted areas than in the solid areas. The walls or unetched portions 44 are thinner in the solid areas than in the highlighted areas.

Figure 5:
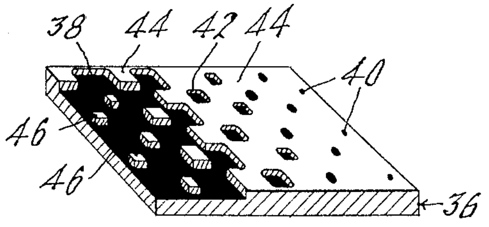
Fig. 5 is an enlarged, partial perspective view of a printing form which has been overetched in a solid area in the endeavor to obtain solid dark printing in this area.

As shown in Fig. 5, the checker-board effect resulting from preparing a printing form with a regular reverse half-tone screened positive generally requires overetching in order to obtain a solid print effect in the areas of the largest dot size. It is necessary to have the ink flush over the unetched portions 44 in order to obtain the solid print appearance. As a result, isolated upstanding pins or pillars 46 are formed. These pins represent unsupported portions of the printing form which the doctor blade eventually breaks off, causing bleeding or stripping of color and renders the cylinder or printing form useless for good work.

Figure 7:
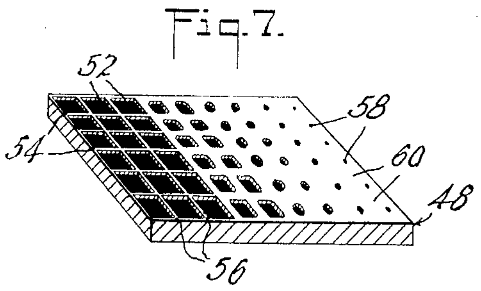
Fig. 7 is an enlarged, partial perspective view of an etched printing form made with the screened positive of Fig. 6.
Figure 8:
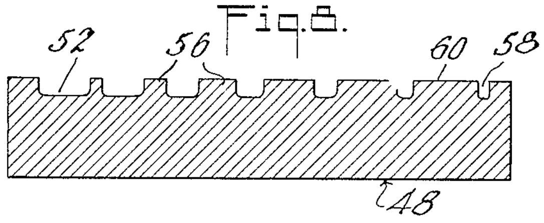
Fig. 8 is an enlarged, partial sectional view of the printing form shown in Fig. 7.

In order to overcome the problems resulting from a printing form made with a conventional grid-like photogravure screen, and the problems attending the use of a printing form made with a regular reverse half-tone screened positive, I have devised a method of making a screened positive from which a printing form may be made having in the solid areas webs or cell walls of sufficient strength to furnish solid definitive printing for a period of time which cannot be obtained from a printing form prepared by means of a regular reverse half-tone screened positive. Also, by means of my screened positive, I am capable of making a printing form which in the very light tone areas possesses cells having boundaries or walls of sufficient height and strength to afford excellent definition of the lightest tones coupled with a length of life of this portion of the printing form which is not attainable with the conventional lined grid photogravure screen. The improved printing form 48 is shown in Figs. 7 and 8, and is prepared with the screened positive 50 shown in Fig. 6.

The printing plate of cylinder 48 has cells 52 in the solid or shadow areas which are strongly defined by horizontally spaced webs 54 and vertically spaced webs 56 in the same manner as with a conventional grid-like gravure screen. In the highlighted areas, cells 58 are smaller in area in a horizontal plane as with cells obtained by etching a form through the medium of a regular reverse half-tone screened positive. However, unlike the checker-board effect obtained by use of a regular reverse half-tone screened positive, the cells 58 are in line with the largest cells 52. In fact, all cells are in line with each other as with a grid screen. Also, unlike the shallow depth of cell obtained with a conventional lined screen, the cells 58 are of the same depth as the cells 52, as shown in Fig. 8, so that the webs have the same height throughout. The thinnest webs or cell walls are the webs 54, 56, which surround the cells 52 in the solid printing areas, and are equal in strength to the strength attained with the conventional gravure lined screen. The unetched or web portions 60 surrounding the smallest cells 58 are, of course, greater in area and possess the strength, which has never been a problem, of a printing form obtained by use of a regular half-tone screened positive. Obviously, for tones intermediate the most solid and the lightest tones, the cells are of smaller size and commensurately the unetched portions of the printing form surrounding the cells are of an area intermediate in size between the webs for the cells in the solid printing areas and in the highlighted areas.

Figure 9:
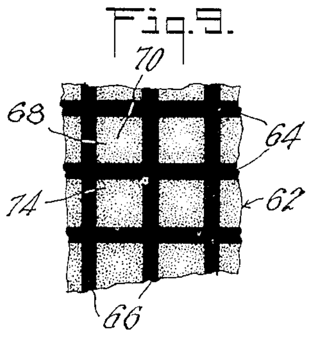
Fig. 9 is an enlarged, partial plan view of a contact screen used in making the screened positive of Fig. 6.
Figure 10:
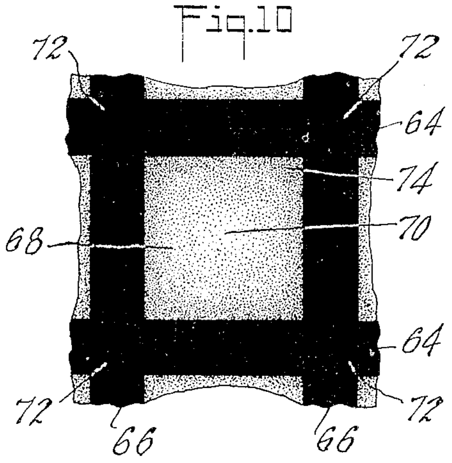
Fig. 10 is a highly magnified plan view of one cell of the screen shown in Fig. 9.

In order to obtain the screened positive 50, permitting preparation of the etched printing form 48, an improved contact screen as shown in Fig. 9 is used. This contact screen, designated 62, comprises horizontally spaced lines 64 and vertically spaced lines 66. The lines cross each other at an angle of 90° and are spaced at 75, 85, 100, 120, 150, or any other suitable number of lines per inch that may be applied to photogravure reproduction. To this extent the screen is the same as any conventional grid-like gravure screen. However, instead of a continuous or same tone within the cells or squares 68, as in a conventional grid-type of gravure screen, the tone is uniformly graduated from the exact center 70, where the density has a tone or gamma of 0 to 0.4 outwardly to the lines 64 and 66, where the square 72 formed by the crossing of the lines is continuous tone and as dark as it is possible to obtain. Just inside each square or cell, and adjacent the opaque square 72, as at 74, the density has a three-quarter tone or gamma of 1.15 to 1.25.

Figure 11:
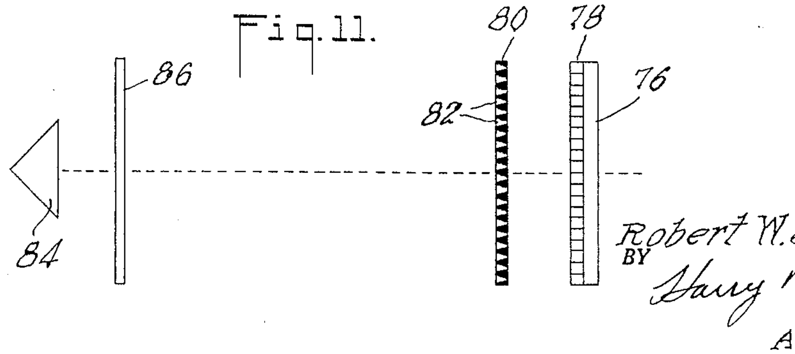
Fig. 11 is a diagrammatic illustration of an arrangement for making the contact screen shown in Fig. 9.

The contact screen 62 is made by an arrangement such as shown in Fig. 11. A continuous tone film or plate 76 is placed upon a suitable support (not shown). In front of, and preferably in contact with, the soft emulsion side of the film 76, a conventional grid-like lined gravure screen 78 is placed. The screen 78 has the desired number of lines and ratio of lines to square formed by the lines. In front of the assembled film and lined screen, a diffraction grating or screen 80, similar to a half-tone screen, is located. This screen is provided with tiny pin-hole apertures 82. In front of this assemblage a light source 84 is located, preferably with a light diffusing member 86, which may be a piece of opal glass, located between the light source and the screen 80. The screens 78 and 80 are optically aligned or registered so that the light passing through the pin-hole apertures 82 will pass through the openings or cells between the opaque lines on the screen 78. Also, the screen 80 is placed, and secured in place, at a distance from the surface of the unexposed film 76 to cause the light passing through the apertures 82 to be out of focus or blurred, with the greatest amount of light providing a core within the center of each square defined by the right-angled lines of the grid screen 78. Upon passing diffused light through the thus arranged screens 78 and 80, the film 76, upon development, possesses white screen lines constituting the image of the gravure lined screen 78, and each square or cell within the lines is graduated and diminishes uniformly in density from its dark core center, where most of the light has impinged, outwardly to the white lines. After exposure and development, the film 76 constitutes a negative or master screen, and upon making a contact print or photographic positive thereof, the contact screen 62 is obtained.

Figure 12:
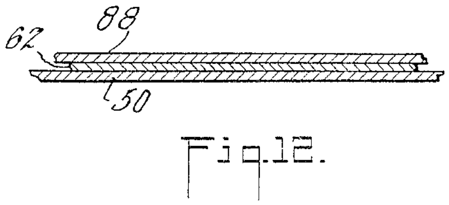
Fig. 12 is an enlarged cross-section showing the manner in which the contact screen illustrated in Fig. 9 is used to make the screened positive shown in Fig. 6 preparatory to making the printing form shown in Fig. 7.

To produce the screened positive 50, the contact screen 62 is placed between a continuous tone negative 88 of the subject and an unexposed film 50, as shown in Fig. 12. The film may be process, contrast or line film, such as Kodalith film as manufactured by the Eastman Kodak Company. The film, contact screen and continuous tone negative are arranged with the emulsion side of the film toward the screen and the emulsion side of the screen toward the film. The continuous tone negative may have its emulsion side toward or away from the screen, depending upon whether a reversal of image is desired. The assembly is subjected to pressure in order to obtain continuous contact throughout their surface areas, and preferably pressure is applied by placing the assembly in a vacuum or hand frame. If desired, contrast or process type plates may be used instead of film. An exposure is made, or light is passed through the negative and contact screen.

Figure 6:
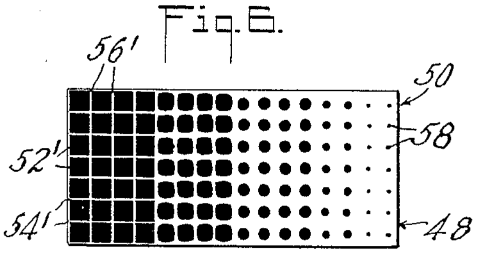
Fig. 6 is an enlarged, partial plan view of a screened positive made in accordance with the present invention.

Upon exposure, the clear areas of the negative 88 permit sufficient light to pass through it to penetrate the strongest tone areas of the screen, producing a black square or cell 52' (Fig. 6). The black lines are sufficiently opaque, or close to a gamma of 3.0, to retard the light and cause clear lines 54', 56' to be formed. In the darkest areas of the negative, the amount of light passed will penetrate through only the center area 70 of each of the squares 68 of the screen, causinng a small black dot or highlight dot 58 to be formed. In the middle tones of the negative more light will pass causing a proportionate increase in the size of the dot. The exposed film or plate 50 is then developed in a suitable contrast developer, fixed, washed and dried. If it is desired to reduce the dot size, this can be accomplished by using any suitable reducing agent as is well known in the art of photoengraving.

Producing a screened positive by means of the described contact screen eliminates the necessity for using a camera or camera arrangement. Also, the operation of screening the carbon tissue is eliminated, as is also the need of many different strengths of etching acids. The printed carbon resist or tissue after being transferred or applied to the cylinder need only be placed in one strength of etching acid to open the cells and to cause etching to start, and after etching has been initiated, the printing plate or cylinder is placed in another acid of higher concentration, and etching allowed to continue to the desired depth. With the temperature and humidity substantially constant and with a copper or other metal of uniform hardness, plates or cylinders can be etched to predetermined and uniform depth in all tone areas of the printing form, thereby providing unusually clear printing definition and long life of the printing form.

It is believed that the advantages and improvements of my contact screen and the method of using the screen to provide a screened positive in preparing improved printing forms both from the standpoint of clarity of printing and life of the forms will be apparent from the foregoing detailed description. It will also be apparent that while the invention has been shown and described in its preferred form, changes may be made without departing from the scope of the invention, as sought to be defined in the following claims.

I claim:

1. A method of making a master for a contact screen of a character permitting the direct formation of a screened positive film or plate without necessitating the use of a camera, comprising disposing a gravure lined screen between the emulsion side of an unexposed film and an artificial light source, said gravure lined screen having opaque horizontally spaced and vertically spaced lines crossing each other at 90° to form squares or cells, placing a pin-hole screen having only one pin-hole aperture for each cell the area of which is substantially less than the area of said cell between and in spaced relation to both said light source and said gravure lined screen, arranging said screens with each pin-hole aperture of the second mentioned screen in alignment with the corresponding cell of the gravure lined screen, passing light directly from said source through said screens and exposing the film, the film upon development possessing white screen lines constituting the image of the gravure lined screen and each square or cell being graduated in density from its center which has a dark core and diminishes in density uniformly in tone outwardly to said white lines.

2. A method of making a contact screen of a character permitting the direct formation of a screened positive film or plate without necessitating the use of a camera, comprising disposing a gravure lined screen in contact with the soft emulsion side of an unexposed continuous tone film, said gravure lined screen having opaque horizontally spaced and vertically spaced lines crossing each other at 90° to form squares or cells, placing a pin-hole screen having only one pin-hole aperture for each cell the area of which is substantially less than the area of said cell in front of and spaced from said gravure lined screen, placing an opal glass light-diffusing member in front of and spaced from said pin-hole screen, arranging said screens with each pin-hole aperture of the pin-hole screen in alignment with the corresponding cell of the gravure lined screen, passing light directly from an artificial light source through said light-diffusing member and said screens and exposing the film, developing the film to form a negative master, the film upon development possessing white screen lines constituting the image of the gravure lined screen with each square or cell graduated in density from its center which has a dark core and diminishes uniformly in tone outwardly to said white lines, and making a photographic positive of the negative master to thereby provide a contact screen.

3. A method of making a contact screen of a character permitting the direct formation of a screened positive film or plate without necessitating the use of a camera, comprising disposing a gravure lined screen in contact with the soft emulsion side of an unexposed continuous tone film, said gravure lined screen having opaque horizontally spaced and vertically spaced lines crossing each other at 90° to form squares or cells, placing a pin-hole screen having only one pin-hole aperture for each cell the area of which is substantially less than the area of said cell in front of and spaced from said gravure lined screen, with each pin-hole aperture of the pin-hole screen in alignment with the corresponding cell of the gravure lined screen and spacing said pin-hole screen from said film a distance to cause light passing through the pin-hole screen to be out of focus, with most of the light located at the center of each cell and diminishing uniformly in density to the lines outlining each cell, placing an opal glass light-diffusing member in front of and spaced from said pin-hole screen, passing light directly from an artificial source through said light-diffusing member and said screens to expose the film and form thereon white screen lines constituting the image of the gravure lined screen with each square or cell graduated in density from a dark center uniformly outwardly to said white lines, developing the film to form a negative master, and making a photographic positive of the negative master to thereby provide a contact screen.

4. A method as defined in claim 1 including the additional steps of developing said film and making a photographic positive of said exposed and developed film.

References Cited in the file of this patent

UNITED STATES PATENTS

| | | |
|---|---|---|
| 1,896,567 | Trist | Feb. 7, 1933 |
| 2,010,042 | Sterling | Aug. 6, 1935 |
| 2,478,443 | Yule | Aug. 9, 1949 |
| 2,596,115 | Austin | May 13, 1952 |
| 2,692,198 | Whitney | Oct. 19, 1954 |

FOREIGN PATENTS

| | | |
|---|---|---|
| 733,424 | France | Oct. 5, 1932 |
| 631,118 | Great Britain | Oct. 27, 1949 |

OTHER REFERENCES

Lockett: Brit. Journal of Photography, pp. 182–3, 1931, Henry Greenwood and Co. Copy in Sci. Lib.